United States Patent
Kotzur et al.

(10) Patent No.: US 9,061,777 B2
(45) Date of Patent: Jun. 23, 2015

(54) TROLLEY APPARATUS FOR UNLOADING AND SUPPORTING HEAVY COILS OF WOUND FILAMENT MATERIAL FROM A WINDING MACHINE TO A PACKAGING TABLE

(71) Applicant: REELEX Packaging Solutions, Inc., Patterson, NY (US)

(72) Inventors: Frank W. Kotzur, Carmel, NY (US); Mark Swanson, Millerton, NY (US); David C. Gamble, Wingdale, NY (US); Eric R. Nelson, Brewster, NY (US)

(73) Assignee: REELEX PACKAGING SOLUTIONS, INC., Patterson, NY (US)

( * ) Notice: Subject to any disclaimer, the term of this patent is extended or adjusted under 35 U.S.C. 154(b) by 18 days.

(21) Appl. No.: 13/768,751

(22) Filed: Feb. 15, 2013

(65) Prior Publication Data

US 2014/0075883 A1    Mar. 20, 2014

Related U.S. Application Data

(63) Continuation of application No. 13/573,464, filed on Sep. 17, 2012.

(51) Int. Cl.
*B62B 1/00* (2006.01)
*B62B 3/02* (2006.01)
(Continued)

(52) U.S. Cl.
CPC ................. *B65B 5/10* (2013.01); *F16M 11/24* (2013.01); *F16M 11/04* (2013.01); *B62B 5/00* (2013.01); *B65B 25/24* (2013.01); *B65B 67/02* (2013.01)

(58) Field of Classification Search
CPC ............ F16M 11/42; F16M 2200/021; F16M 2200/02; F16M 2200/06; A47F 7/00; A47F 7/0028; A47F 7/17; A47F 7/175; A47B 81/00; A47B 81/007; B21C 47/24; B21C 47/242; B21C 47/245; B25H 1/00; B25H 1/0007; B25H 1/04; B60B 29/002; B60B 29/001; B62B 2202/02; B62B 3/00; B62B 3/002; B62B 3/104; B62B 3/006; B62B 3/02; B62B 1/00; B62B 1/12; B62B 1/26; B62B 1/262; B62B 1/264; B62B 2202/025; B65B 67/00; B65B 67/02; B65B 67/04; B65H 2405/40; B65H 2405/422; B65H 2405/4221; B65H 2405/4223
USPC ............ 280/79.6, 79.7, 79.2, 79.3, 79.4, 638, 280/639, 651, 652, 654, 659, 1, 29, 35; 53/390, 116; 211/13.1, 44; 414/426, 414/427, 911, 684; 269/17; 254/2 B
See application file for complete search history.

(56) References Cited

U.S. PATENT DOCUMENTS

| 1,463,181 A | 7/1923 | Vorderwinkler |
| 1,529,816 A | 3/1925 | Stenglein |

(Continued)

FOREIGN PATENT DOCUMENTS

DE              532861            9/1931

OTHER PUBLICATIONS

U.S. Appl. No. 13/506,545; Timothy M. Copp et al, filed Apr. 27, 2012; "Proflex" Shrink Bag with Handle & Handle Isolation Apparatus.

(Continued)

*Primary Examiner* — J. Allen Shriver, II
*Assistant Examiner* — James M Dolak
(74) *Attorney, Agent, or Firm* — Gordan & Jacobson, PC

(57) ABSTRACT

A trolley for moving heavy objects such as wire coils from a machine to a container at a packaging table is provided. The trolley includes spring-loaded spaced arms movably mounted for vertical height adjustment so that the arms are just below the coil when it is on the machine and rotational movement to separate the spaced arms with the spaced arms retaining the heavy object during movement of the trolley apparatus, and locking arms engaging the spaced arms during movement of the trolley apparatus to prevent separation thereof. The spring-loaded arms permit the heavy object to be manually pushed downward therebetween, thereby forcing the arms apart enabling the object to fall from the trolley into a container on a packaging table. The table includes a platform for supporting the container, a motor for raising/lowering the platform, and a mechanism for retaining the container and aiding its alignment with the coil.

13 Claims, 12 Drawing Sheets

(51) Int. Cl.
  *B65B 5/10* (2006.01)
  *F16M 11/24* (2006.01)
  *F16M 11/04* (2006.01)
  *B62B 5/00* (2006.01)
  *B65B 25/24* (2006.01)
  *B65B 67/02* (2006.01)

(56) References Cited

U.S. PATENT DOCUMENTS

| | | |
|---|---|---|
| 2,388,557 A | 11/1945 | Little et al. |
| 2,459,747 A | 1/1949 | Kolbe |
| 2,634,918 A | 4/1953 | Taylor et al. |
| 2,634,922 A | 4/1953 | Taylor |
| 2,650,036 A | 8/1953 | Berkepeis |
| 2,738,145 A | 3/1956 | Taylor |
| 2,767,938 A | 10/1956 | Taylor |
| 2,929,569 A | 3/1960 | Detrick et al. |
| 2,943,732 A | 7/1960 | Kovaleski et al. |
| 2,971,709 A | 2/1961 | Ellis |
| 3,061,238 A | 10/1962 | Taylor |
| 3,150,769 A | 9/1964 | Cohn |
| 3,178,130 A | 4/1965 | Taylor |
| 3,589,096 A | 6/1971 | Podvin |
| 3,643,987 A | 2/1972 | DuPont |
| 3,655,140 A | 4/1972 | Gordon et al. |
| 3,666,200 A | 5/1972 | Newman et al. |
| 3,677,490 A | 7/1972 | Gordon et al. |
| 3,677,491 A | 7/1972 | Gerwig |
| 3,747,861 A | 7/1973 | Wagner et al. |
| 3,748,817 A | 7/1973 | Newman |
| 3,812,640 A | 5/1974 | Knott |
| 3,877,653 A | 4/1975 | Foltyn et al. |
| 3,923,270 A | 12/1975 | Newman et al. |
| 3,980,244 A | 9/1976 | Pietroni |
| 3,982,712 A | 9/1976 | Bassett |
| 3,985,315 A | 10/1976 | Newman |
| 4,009,845 A | 3/1977 | Santucci et al. |
| 4,019,636 A | 4/1977 | Wise |
| 4,022,399 A | 5/1977 | Zajac |
| 4,057,203 A | 11/1977 | Newman et al. |
| 4,057,204 A | 11/1977 | Zajac |
| 4,085,902 A | 4/1978 | Wagner |
| 4,098,467 A | 7/1978 | Engmann et al. |
| 4,160,533 A | 7/1979 | Kotzur et al. |
| 4,274,607 A | 6/1981 | Priest |
| 4,283,020 A | 8/1981 | Bauer et al. |
| 4,285,157 A | 8/1981 | Lambert |
| 4,313,579 A | 2/1982 | Zuber et al. |
| D267,394 S | 12/1982 | Liptak et al. |
| 4,367,853 A | 1/1983 | Kotzur |
| 4,373,687 A | 2/1983 | Zicko |
| 4,406,419 A | 9/1983 | Kotzur |
| 4,477,033 A | 10/1984 | Kotzur et al. |
| 4,523,723 A | 6/1985 | Kotzur |
| D285,176 S | 8/1986 | Kodousek et al. |
| 4,637,564 A | 1/1987 | Hallenback et al. |
| 4,682,929 A * | 7/1987 | Kataoka ............ 414/911 |
| 4,792,100 A | 12/1988 | Pepe |
| 4,817,796 A | 4/1989 | Camillo et al. |
| 4,884,764 A | 12/1989 | Hill |
| 5,042,739 A | 8/1991 | Zajac |
| 5,053,795 A | 10/1991 | Wyman |
| 5,115,995 A | 5/1992 | Hunt |
| 5,121,584 A | 6/1992 | Suter |
| 5,150,789 A | 9/1992 | Bass |
| 5,150,852 A | 9/1992 | Hunt et al. |
| 5,203,139 A | 4/1993 | Salsburg et al. |
| D341,777 S | 11/1993 | Sheu |
| D348,392 S | 7/1994 | Tannen |
| 5,368,245 A | 11/1994 | Fore |
| 5,470,026 A | 11/1995 | Kotzur |
| 5,499,775 A | 3/1996 | Vander Groef |
| 5,509,671 A * | 4/1996 | Campbell ............ 280/47.19 |
| 5,520,347 A | 5/1996 | Bass et al. |
| 5,529,186 A | 6/1996 | Bass |
| 5,593,035 A | 1/1997 | Taylor et al. |
| 5,624,528 A | 4/1997 | Abrams et al. |
| 5,678,778 A | 10/1997 | Kotzur et al. |
| 5,714,936 A | 2/1998 | Regelsberger |
| 5,716,183 A * | 2/1998 | Gibson et al. ............ 414/451 |
| D396,632 S | 8/1998 | Lee |
| 5,791,855 A * | 8/1998 | Dixon ............ 414/445 |
| 5,797,557 A * | 8/1998 | Wang et al. ............ 414/911 |
| 5,803,394 A | 9/1998 | Kotzur et al. |
| 5,810,272 A | 9/1998 | Wallace et al. |
| D400,096 S | 10/1998 | Lee |
| D406,753 S | 3/1999 | Lee |
| 5,915,646 A * | 6/1999 | Campbell ............ 242/594.4 |
| 5,941,050 A | 8/1999 | Georgetti et al. |
| 5,979,812 A | 11/1999 | Kotzur et al. |
| 6,003,667 A | 12/1999 | Barnett et al. |
| 6,086,012 A | 7/2000 | Kotzur et al. |
| 6,098,378 A | 8/2000 | Wyatt |
| 6,109,554 A | 8/2000 | Kotzur et al. |
| 6,135,466 A * | 10/2000 | Irwin ............ 280/47.28 |
| 6,145,722 A | 11/2000 | Behrens et al. |
| 6,276,623 B1 | 8/2001 | Williams |
| 6,341,741 B1 | 1/2002 | Kotzur et al. |
| 6,406,248 B1 * | 6/2002 | McGill et al. ............ 414/634 |
| 6,491,163 B1 | 12/2002 | Grcic et al. |
| 6,702,213 B2 | 3/2004 | Kotzur et al. |
| 6,766,627 B2 | 7/2004 | Kotzur et al. |
| 7,100,346 B2 | 9/2006 | Kotzur et al. |
| 7,185,899 B2 * | 3/2007 | Thiede et al. ............ 280/47.35 |
| D541,145 S | 4/2007 | Copp |
| 7,249,726 B2 | 7/2007 | Kotzur |
| 7,331,543 B2 * | 2/2008 | Yu Chen ............ 242/597.4 |
| 7,398,979 B2 * | 7/2008 | Yu Chen ............ 280/47.24 |
| 7,469,520 B2 | 12/2008 | Lancaster, III et al. |
| 7,546,971 B2 * | 6/2009 | Pappas ............ 414/911 |
| 7,686,260 B1 * | 3/2010 | Tetradis ............ 248/98 |
| 7,823,862 B2 * | 11/2010 | Wakil ............ 254/8 R |
| 7,914,016 B2 * | 3/2011 | Guttormson ............ 280/47.19 |
| 8,191,337 B2 | 6/2012 | Moore |
| 8,262,108 B2 * | 9/2012 | Al-Hasan ............ 280/47.371 |
| 8,366,126 B2 * | 2/2013 | Galgano et al. ............ 280/47.19 |
| 8,950,732 B2 * | 2/2015 | Jordan et al. ............ 254/3 R |
| 8,967,634 B2 * | 3/2015 | Barnes et al. ............ 280/47.29 |
| 2002/0174626 A1 | 11/2002 | Lancaster, III et al. |
| 2003/0085316 A1 * | 5/2003 | Mostowy ............ 242/557 |
| 2007/0272346 A1 | 11/2007 | Shpik et al. |
| 2008/0277523 A1 | 11/2008 | Delmore |
| 2010/0021275 A1 * | 1/2010 | Ratermann ............ 414/454 |

OTHER PUBLICATIONS

U.S. Appl. No. 13/506,574; Timothy M. Copp et al, filed Apr. 30, 2012; Apparatus for Dividing Heat-Shrinkable Plastic Film into Different Temperature Regions.

* cited by examiner

TROLLEY APPARATUS FOR UNLOADING AND SUPPORTING HEAVY COILS OF WOUND FILAMENT MATERIAL FROM A WINDING MACHINE TO A PACKAGING TABLE

BACKGROUND OF THE INVENTION (1) Field of the Invention

This invention relates to apparatus and a process for unloading heavy packages from packaging machines and transporting them to a packaging table, and more particularly to such apparatus and a process for unloading heavy coils of wound filament material from a coil winding machine and transporting them to a coil packaging table. More specifically, the invention relates to such apparatus and process for unloading heavy coils of filament material wound in a REELEX figure eight configuration from a coil winding machine and transporting them to a coil packaging table that is capable of receiving the heavy package in a container positioned on the packaging table and has at least vertical degrees of movement. (REELEX is the trademark of REELEX Packaging Solution, Inc., 39 Jon Barrett Road, Patterson, N.Y. 12563. and registered under Trademark Registration Nos. 1,100,554 and 1,259,164. The REELEX wind is described in U.S. Pat. No. 5,678,778; High Speed, Dual Head, On-Line Winding Apparatus; issued Oct. 21, 1997; U.S. Pat. No. 5,979,812; Coil with large Payout Hole and Tube for Kinkless Payout; issued Nov. 9, 1999; and U.S. Pat. No. 6,766,627; Machine for Boxing Wound Coils of Filamentary Material; issued Jul. 27, 2004.

(2) (Description of Related Art

Prior to the subject invention, heavy coils of wound filament material were lifted manually from the coil winding machine, such as REELEX winders, and manually moved to a packaging table where the heavy coil was placed in a container. In all Reelex winding machines that require manual packaging, the coil is wound on a mandrel between two endforms. The mandrel has a plurality of segments (typically 6) that have a hinge arrangement that allows the mandrel segments to "collapse" once an endform is removed and the coil tugged on. This has the effect of making the mandrel diameter smaller so that the coil can be removed. In a typical layout, once the coil is completed, the operator would remove the endform, or it would be automatically removed, and tug on the coil. The mandrel segments would collapse and the coil would then be lifted off the mandrel. Then, in a typical factory set up, the operator would turn 180° and take one or two steps forward and place the coil on a table (packaging station). The packaging process consists of inserting a payout tube into the payout hole of the coil and threading the inner end of the wound material through the payout tube. The operator then lifts the coil and places it into a container. The container is then closed and lifted again to place it onto a pallet.

The present invention provides an apparatus that is used to help unload and support heavy coils of wound filamentary material from manual coil winders that are manually wheeled to a packaging station where they are placed in appropriate package containers for shipment or storage as the case may be. The Trolley device eliminates any need to ever lift the coil as will become apparent in the description.

However, the invention is not limited solely to the handling of heavy coils but, as will be apparent from the following description, has broad application to the handling of many objects other than coils that need to be moved from one place to a packaging table.

BRIEF SUMMARY OF THE INVENTION

The apparatus of the invention comprises a wheeled trolley apparatus used to help unload and support heavy coils of wound filamentary material from manual winding machines and transports them on the wheeled apparatus to a packaging table where they are deposited in appropriate coil containers on the packaging table. The packaging table itself has features, such as vertical movement and arms to position the container on the packaging table enabling the heavy coils to be deposited into an appropriate container on the packaging table.

The wound coil is manually removed, but not lifted, from the winding machine and placed on a wheeled trolley apparatus having two spaced arms for supporting the wound coil. The arms are mounted to a wheeled cart-like apparatus enabling the wound coil to be easily transported to a packaging table containing a container into which the coil is placed after being removed from the arms of the trolley apparatus.

The trolley apparatus and packaging table of the invention has specific application to the unloading of heavy coils of filamentary material wound in a figure-eight configuration known in the trade as a REELEX wind from a REELEX manual winding machine. The REELEX wind is described in the aforementioned U.S. patents. However, the invention is not limited to the handling of heavy wound coils of filamentary material, but has application to the handling of any type of heavy object that is to be transported from a machine to a packaging table.

BRIEF DESCRIPTION OF THE SEVERAL VIEWS OF THE DRAWINGS

The objects, features and advantages disclosed herein are readily apparent from the following description of a preferred embodiment of the best mode of carrying out the invention when taken in conjunction with the following drawings, wherein.

DETAILED DESCRIPTION OF THE INVENTION

Figure 16:
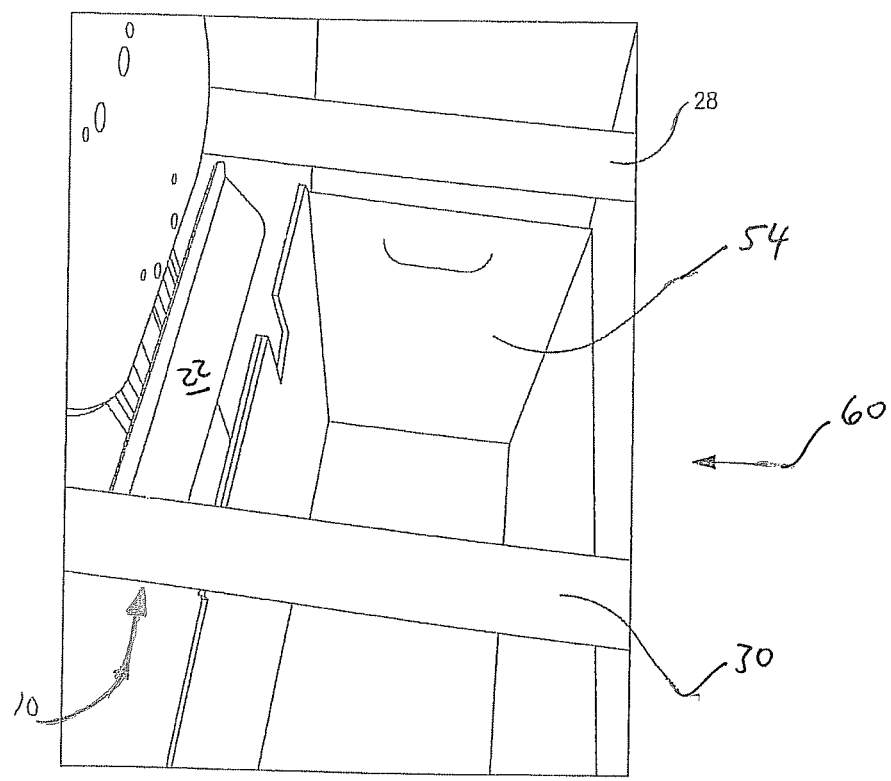
FIG. 16 is an overhead view of the trolley apparatus at the packaging table and showing the position of the trolley apparatus and the spaced arms for supporting the heavy coil.
Figure 17:
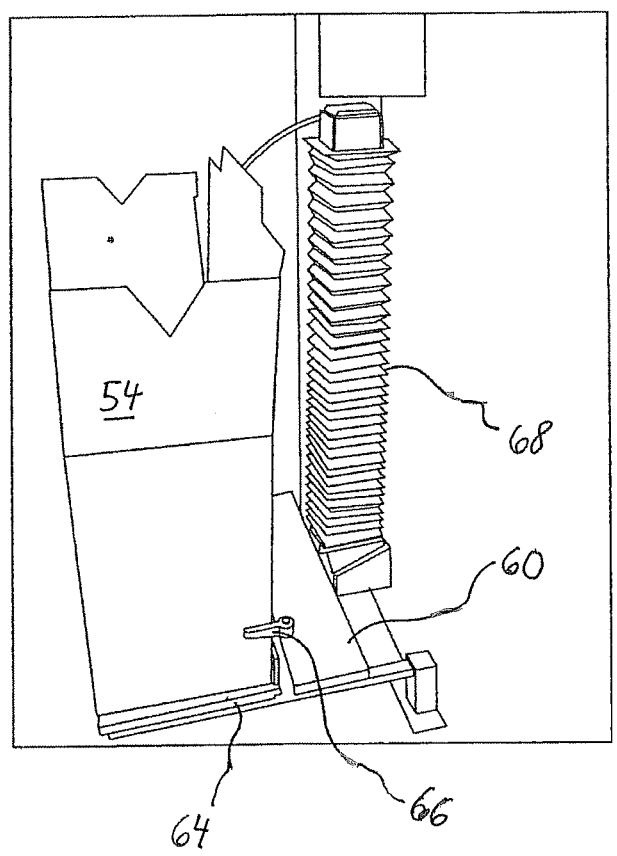
FIG. 17 is a side view of the packaging table with a container supported thereon and the vertical tower including a motor for raising and lowering the packaging table.
Figure 18:
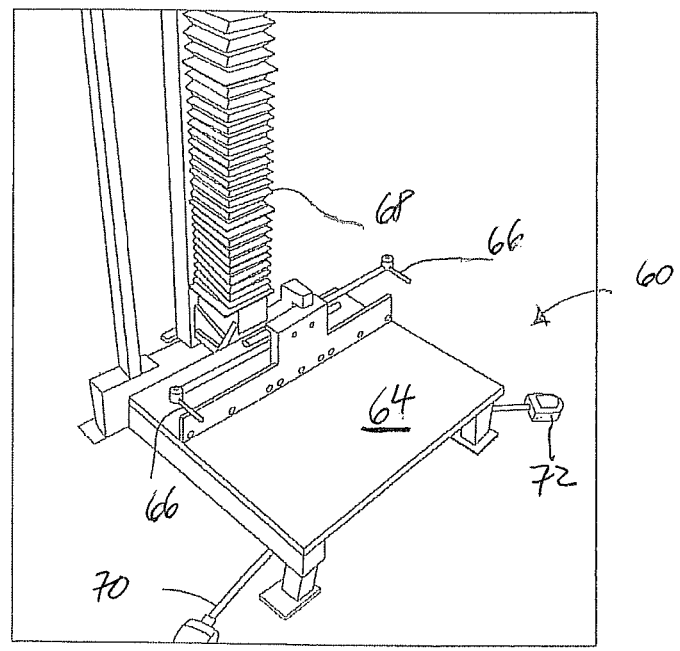
FIG. 18 is an overhead view of the packaging table showing the vertical tower, foot-operated tread switches for raising and lowering the packaging table, and the spaced arms for holding the container on the packaging table.

FIGS. 1 to 5 are directed to the construction of the trolley apparatus 10 and FIGS. 6 to 15 are directed to the manner in which the trolley apparatus 10 is used to convey a heavy coil (e.g., 50, FIG. 6) from a winding machine to a container (e.g., 54, FIG. 9), mounted on a packaging table (e.g. 60, FIG. 15), for shipment. FIGS. 16 to 18 are directed to the packaging table for receiving the heavy package from the trolley apparatus 10 and the cooperation of the trolley apparatus 10 with the packaging table (e.g., 60, FIGS. 17 and 18).

Figure 1:
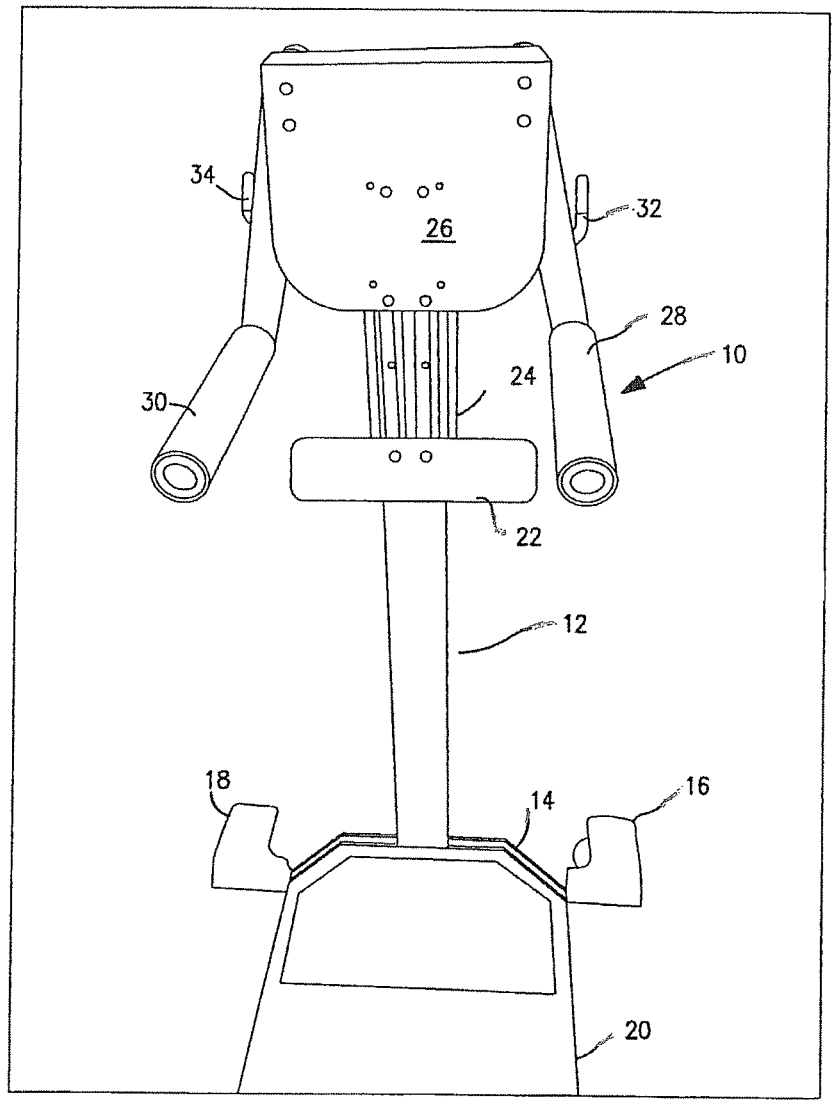
FIG. 1 is a front view of the wheeled trolley apparatus showing the spaced support arms for retaining the heavy wound coil in the trolley apparatus; the spaced arms are built around an axle and are free to spin.

The front view of the trolley apparatus 10 in FIG. 1 includes frame member 12 with a carriage 14 having wheels 16 and 18 mounted on a wheeled platform 20. Coil guide 22 is mounted on vertically extending slide member 24 to be movable vertically for reasons that will be described hereafter. Back support member 26 is also movably mounted to slide member 24 and includes spaced arm members 28, 30. Spaced arm locking members 32, 34 serve to prevent outward movement of spaced arm members 28, 30 as is described hereinafter. In FIG. 1 spaced arm locking members 32, 34 are shown in their inoperative position, i.e. enabling outward movement of spaced arm members 28, 30.

Figure 2:
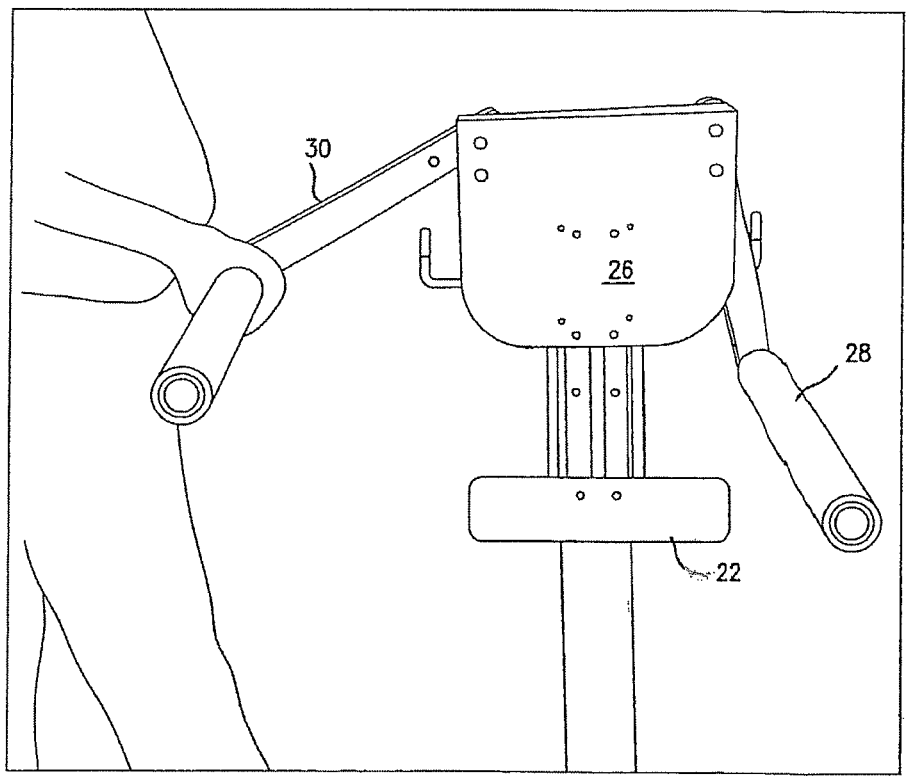
FIG. 2 is a front view of the trolley apparatus showing the rotation of one of the spaced support arms to assist in placing the wound coil on the trolley apparatus and removal of the heavy wound coils from the trolley apparatus.

FIG. 2 illustrates the manner in which a spaced arm member 30, if unlocked, is free to rotate outward to enable the heavy coil to pass between the two arms when the coil is simply pushed downward. Spaced arm member 28 is illustrated in its normal rest position.

Figure 3:
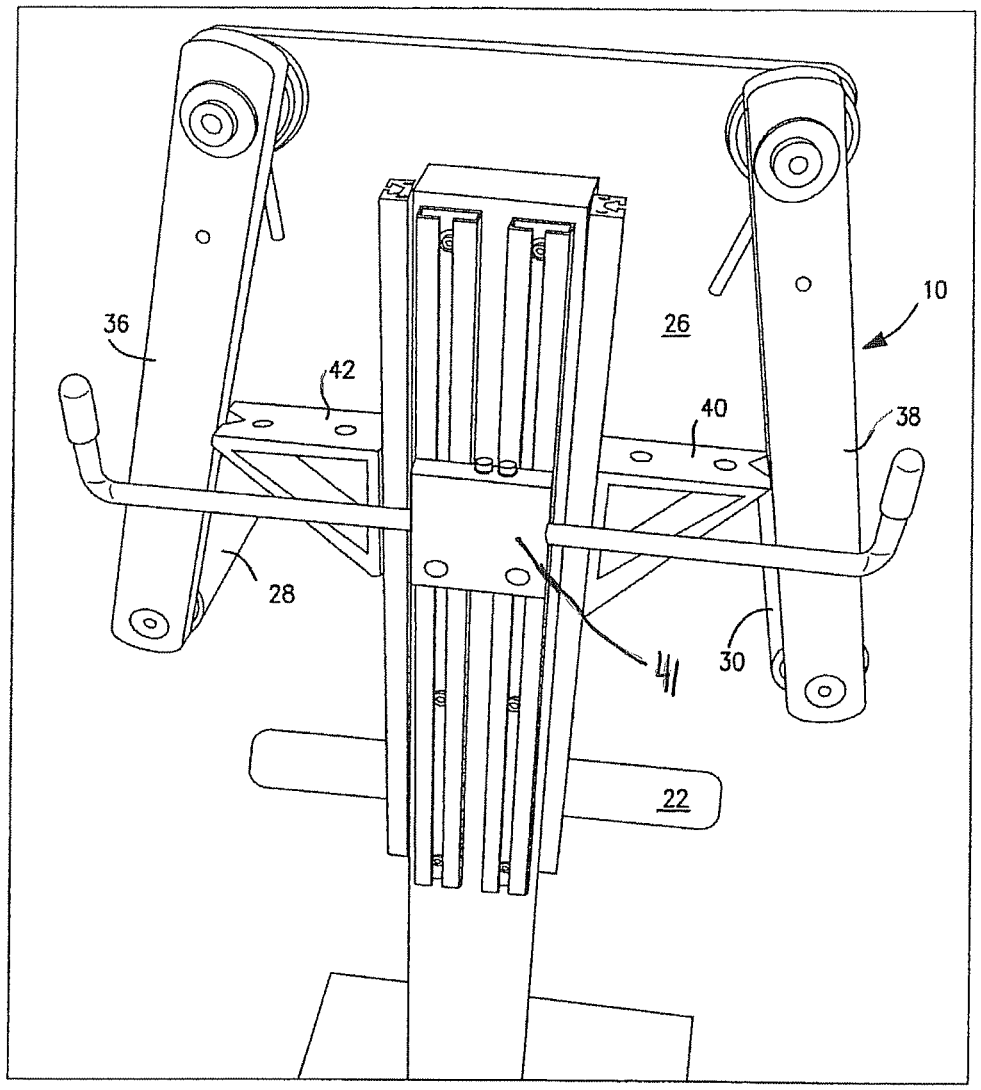
FIG. 3 is a rear view of the trolley apparatus showing the rotatable attachment of the spaced support arms to the back of the trolley apparatus and the rotatable locking/unlocking members for securing/releasing the spaced support arms for placing the heavy wound coils on the trolley apparatus and removing the heavy wound coils from the trolley apparatus. In this Fig. the rotatable locking/unlocking members are shown in their upright position for enabling rotation of the spaced support arms.

FIG. 3 illustrates the back of the trolley apparatus 10 with spaced arm members 28, 30 mounted on respective arm members 36, 38 attached to back support member 26. The height of the back support member 26 can be adjusted to allow the height of the spaced arm members 28, 30 to accommodate different coil diameters when removing the coil from the winding machine. The height of the back support member 26 is adjusted so that the spaced arm members 28, 30 are just under the coil so that when the coil is tugged on it falls onto the spaced arm members 28, 30. Spaced arm locking members 34 are mounted to a movable member 41 whereby the arm locking members 32, 34 can be moved vertically upwardly or downwardly in conjunction with the vertical movement of spaced arm members 28, 30. Stop members 40, 42 limit the inward movement of the spaced arm members 28, 30. Also, by raising or lowering arm members 38, 40, the spacing of the spaced arm members 28, 30 will be altered. This is done to adjust the spacing between the spaced arm members 28, 30 to accommodate different coil diameters. Coil guide 22 is also shown. During the packaging process, when the coil is pushed downward—causing the arm members 36, 38 and spaced arm members 28, 30 to open—the coil might hit the container edge closest to the trolley apparatus 10 and prevent the coil from properly entering the container. The coil guide 22 is a plate that is slightly angled from the vertical that "hides" the container's edge from the coil. The coil does not rest on the coil guide 22. Rather, the coil is simply guided by the coil guide 22 as the coil enters a container.

Figure 4:
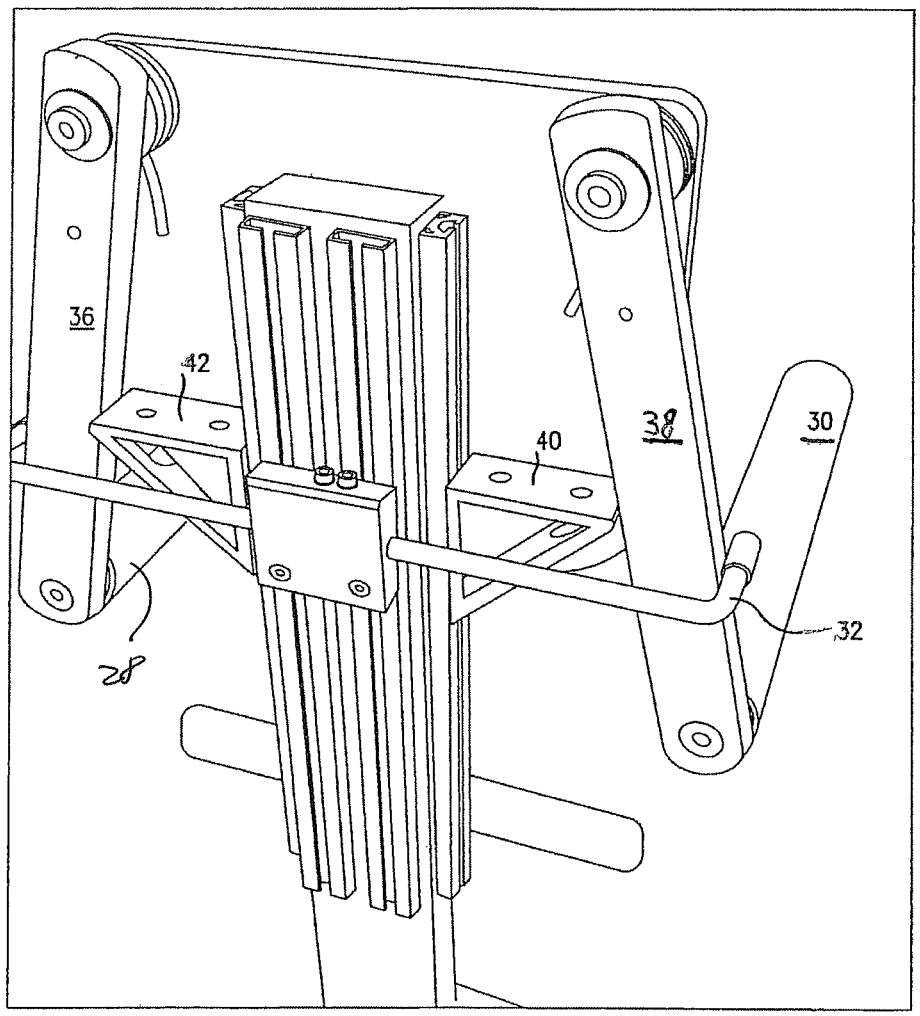
FIG. 4 is an oblique view of the back of the trolley apparatus showing the rotatable locking members in their locked position preventing movement of the spaced support arms.

FIG. 4 shows spaced arm locking member 32 engaging spaced arm member 28 thereby preventing rotation of the latter, which is the position of these members with a heavy coil (not shown in FIG. 4) in the trolley apparatus 10.

Figure 5:
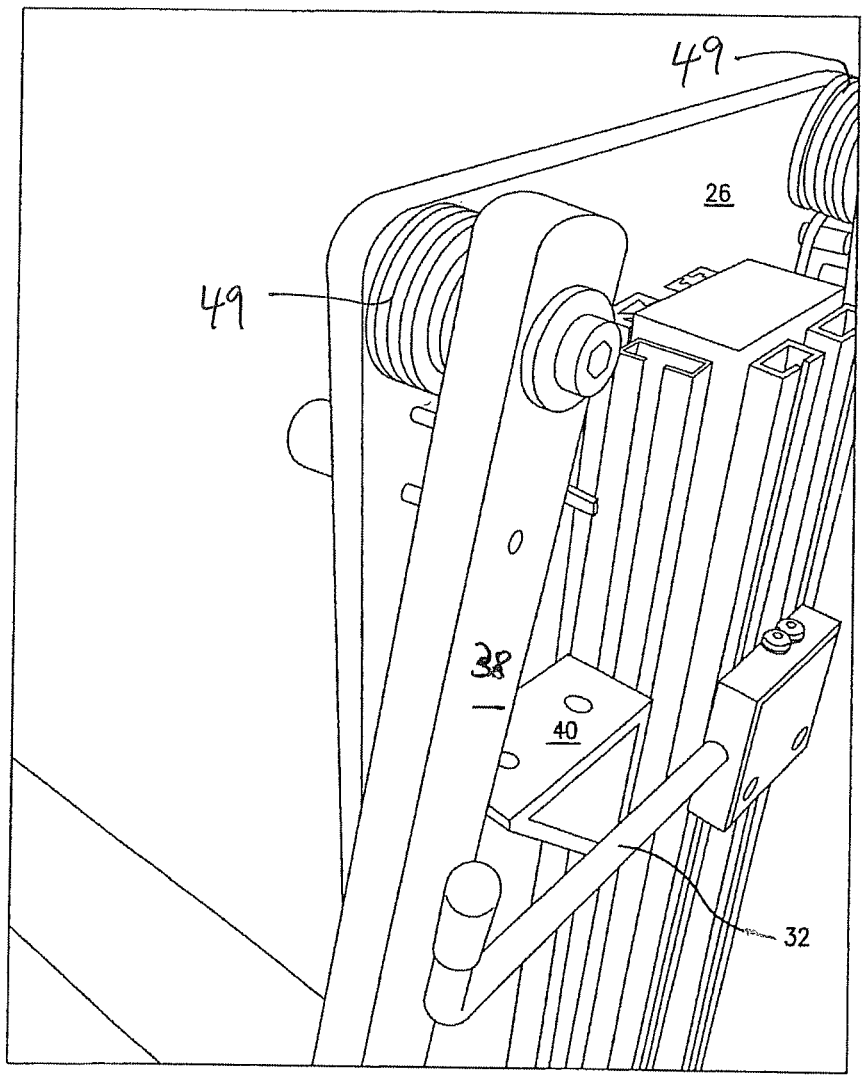
FIG. 5 is an oblique view of the back of the trolley apparatus showing the guide rails for raising/lowering the platform for supporting the heavy coils, the guide rails for raising/lowering the locking mechanism and the attachment of the rotatable spaced support arms to the trolley apparatus and the torsion springs that keep the arms against stops.

FIG. 5 is a detailed view of the back support member 26, arm member 38, with stop member 40 and spaced arm locking member 32 in its inoperative position, i.e. not engaging arm member 38. Also visible are torsion springs 49 located around the rotation points of arm members 38 and 36 (36 not shown in FIG. 5). The springs 49 are configured to prevent the weight of a coil from naturally opening the spacing between the arm members 36, 38 and spaced arm members 28, 30 if the spaced arm locking member 32 is in the "off" (i.e., unlocked) position. It is desired that the operator gently push downward on the coil to force the arm members 36, 38 and spaced arm members 28, 30 to separate and allow the coil to pass between the spaced arm members 28, 30.

Figure 6:
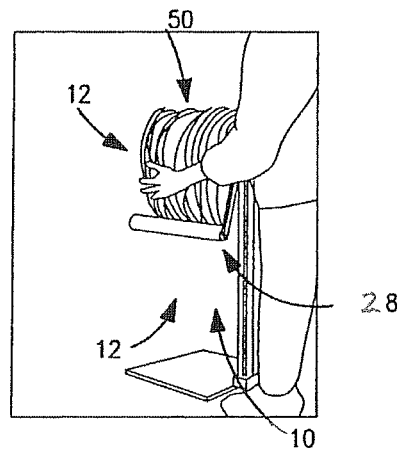
FIG. 6 is a side view of the trolley apparatus showing the manual removal of the heavy wound coil from the winding machine; it is important to note that the coil is never lifted. By tugging on the coil, the mandrel collapses and the coil falls onto the support arms and with the locks on, the coil will not force the support arms apart.

In FIG. 6 the trolley apparatus 10 is shown with frame member 12 and spaced arm members 28, 30 (only member 28 shown in FIG. 6) mounted thereon in spaced relation to one another to support heavy wound coil 50, which is shown being removed by hand from a mandrel of a manually operated coil winding machine (not shown). As described earlier, the operator simply tugs on the coil which causes the mandrel segments to collapse naturally dropping the coil onto the spaced arm members 28, 30 of the trolley apparatus 10. The operator does not lift the heavy coil 50.

Figure 7:
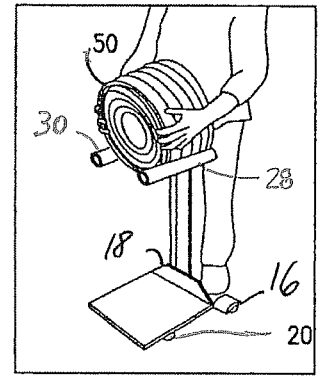
FIG. 7 shows the heavy wound coil, having fallen onto the arms, being held by the Reelex machine operator to stabilize it on the arms of the trolley apparatus as it is withdrawn from the collapsed mandrel.

In FIG. 7 the heavy coil 50, having been dropped onto the trolley apparatus 10, and resting between the spaced arm members 28, 30, is being backed away from the winding machine (not shown). The trolley apparatus 10 includes wheels 16, 18 enabling the trolley apparatus 10 to be rolled from the winding machine to a packaging table 60 (FIG. 15) (to be described later). The spaced arm members 28, 30 support the heavy coil 50 as shown in FIGS. 8 and 9.

Figure 8:
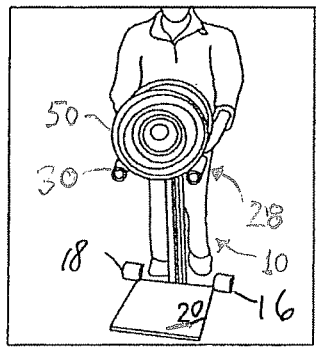
FIG. 8 shows a heavy wound coil on the trolley apparatus being rolled to a packaging table.

In FIG. 8 the heavy wound coil 50 is shown supported by spaced arm members 28, 30 mounted on trolley apparatus 10, thereby enabling the heavy coil 50 to be easily rolled from the mandrel of the winding machine to the packaging table (shown in FIGS. 9 to 14).

Figure 9:
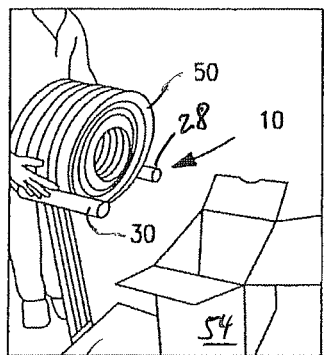
FIG. 9 shows the trolley apparatus with the heavy wound coil mounted between the arms of the trolley apparatus as the trolley apparatus approaches the packaging table.

In FIG. 9 the wheeled platform 20 of the trolley apparatus 10 is being aligned with a base 63 (FIG. 15) and a platform 64 (FIG. 10) of the packaging table 60 so that the heavy wound coil 50 is over a packaging container 54 in preparation for allowing the heavy wound coil 50 to drop into the packaging container 54. The wheeled platform 20 of the trolley apparatus 10 and the base 63 of the packaging table 60 are designed as a mate to one another to aid with a left/right alignment process.

Figure 10:
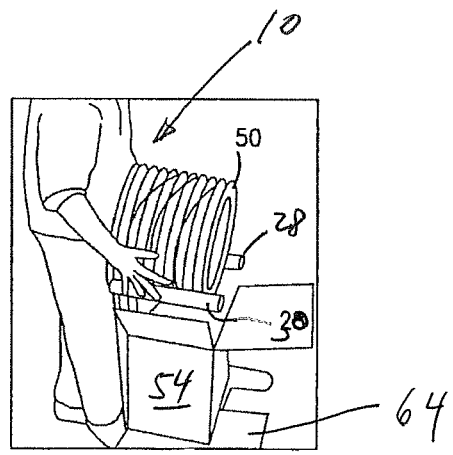
FIG. 10 shows the heavy wound coil and trolley device being aligned with the package container.

In FIG. 10 the heavy wound coil 50 is shown aligned with the packaging container 54. Not visible in the figure is the coil guide 22 discussed in [0029]. The coil guide 22, which now covers the edge of the packaging container 54, will prevent the coil 50 from hitting the edge of the packaging container 54 that is nearest the trolley apparatus.

Figure 11:
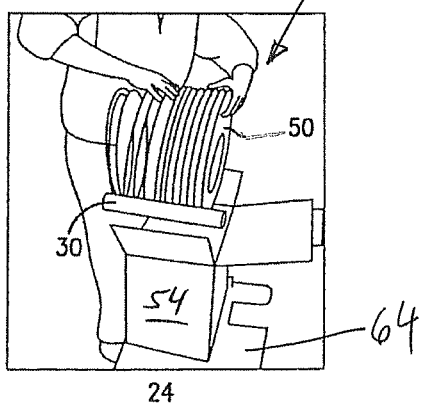
FIG. 11. With the arm locks turned to the unlock position, shows the heavy wound coil being pushed downward thereby forcing the two arms apart and allowing the coil to slide between them and into the package container.

In FIG. 11 the operator would, at this time, insert a payout tube into the payout hole of the coil and thread the inner end of the coil through the payout tube. These few operations are not shown. In this figure the operator has unlocked the spaced arm member 28, 30 and is preparing to push downward on the heavy wound coil 50. By the simple action of pushing down, the arm members 36, 38 and spaced arm members 28, 30 will separate against the resistance of the torsion springs 49 and the coil 50 will pass through the spaced arm members 28, 30 and drop into the packaging container 54 with absolutely no lifting of the heavy coil 50 required.

Figure 12:
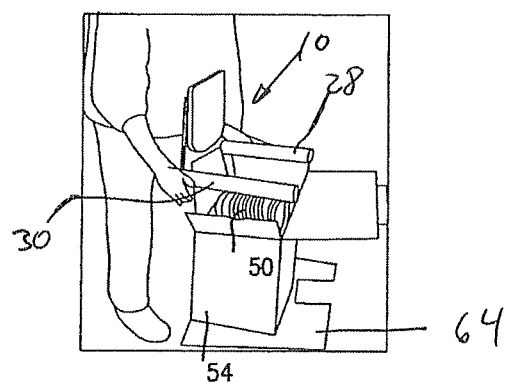
FIG. 12 shows the heavy wound coil, having slipped between the arms, deposited in the package container.

In FIG. 12 the heavy coil 50, having passed between the spaced arm members 28, 30, is in the packaging container 54.

Figure 13:
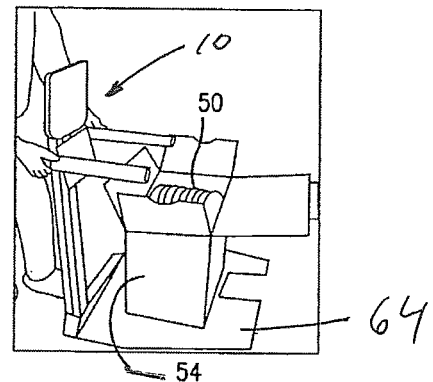
FIG. 13 shows the trolley apparatus being removed from the vicinity of the package container.

In FIG. 13 the trolley apparatus 10 is shown being withdrawn from the packaging container 54 with the heavy wound coil 50 placed inside the packaging container 54.

Figure 14:
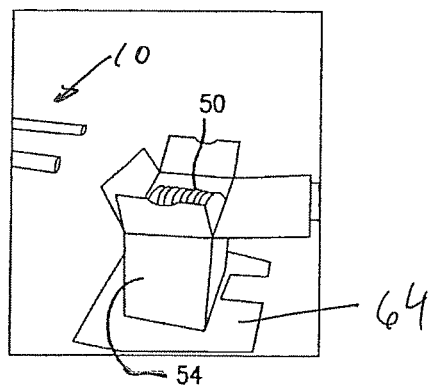
FIG. 14 shows the trolley apparatus being completely removed from the package container and the heavy wound coil being placed in the package container.
Figure 15:
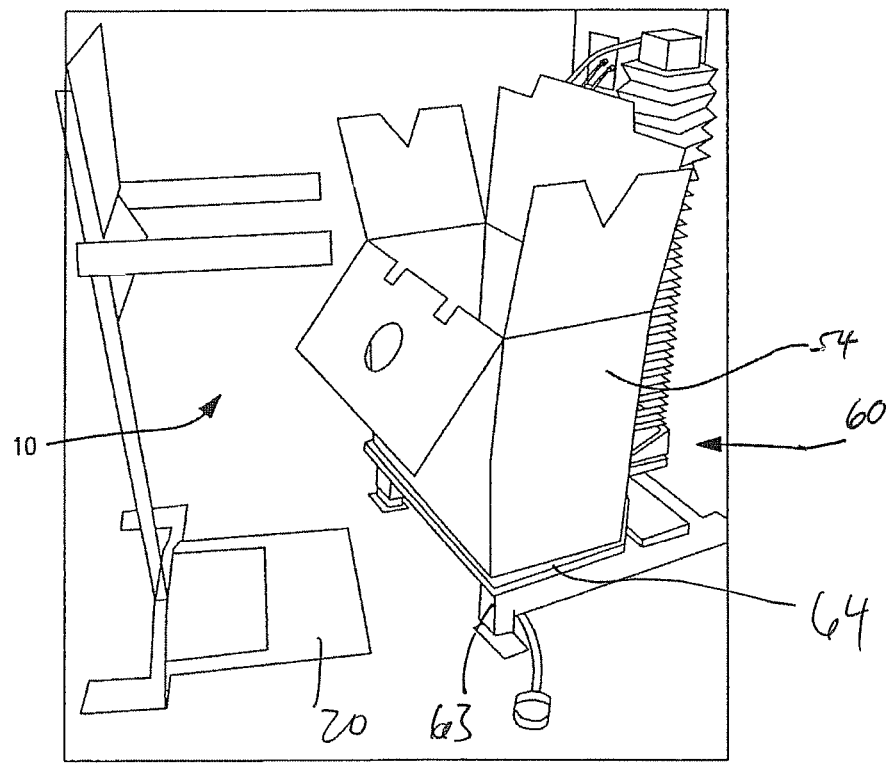
FIG. 15 illustrates the packaging table and the trolley apparatus with a container positioned on the packaging table and with the trolley apparatus just removed from a position over the container.

In FIG. 14 the trolley apparatus 10 is shown being wheeled or rolled away from the package container 54 on the packaging table and in FIG. 15 the wheeled trolley apparatus 12 is shown completely removed from the packaging table 60.

In FIG. 15 the trolley apparatus 10 is shown wheeled away from the packaging table 60 so that the packaging container 54 can be closed for shipment or storage as the case may be. The packaging table 60 is shown in FIG. 15 supporting the packaging container 54 and with the trolley apparatus 10 removed from a position over the packaging table 60. Presumably a heavy coil or other object has been removed from the trolley apparatus 10 and into the packaging container 54.

In FIG. 16 the spaced arm members 28, 30 of the wheeled trolley apparatus 10 are shown positioned over the packaging container 54 and, upon separation of the spaced arm members 28, 30, the object supported by the trolley apparatus 10 can be deposited into the packaging container 54. Also, the coil guide 22 discussed in [0029] is shown. The use of such a coil guide 22 can now be seen in greater detail. Once the trolley apparatus 10 is against the packaging container 54, the coil 50 (FIG. 6) might strike the edge of the packaging container 54 and prevent the coil 50 from properly entering the packaging container 54. The guide 22 prevents this from happening.

In FIG. 17 the packaging container 54 is supported by the packaging table 60, and the packaging container 54 is held in position on the platform 64 by rotatable arms 66 (only one being shown in FIG. 17). Vertical tower 68 consists of a vertical drive for raising and lowering the platform 64.

FIG. 18 shows the packaging table 60 with platform 64, arms 66 for retaining a container (e.g., packaging container 54) on the platform 64, the vertical tower 68 and switches 70, 72 for controlling the raising or lowering of the platform 64. Vertical tower 68 includes a mechanism for raising and lowering the 64 by foot-activated switch 70 for lowering the platform 64 and foot-activated switch 72 for raising the platform 64. Vertical tower 68 includes limit switches (not shown) for controlling both the lower and upper limits of movement of the packaging table platform 64.

The present invention enables heavy objects to be removed from a machine and placed on a trolley apparatus and rolled or wheeled to a packaging table where the heavy object may be relatively easily manually removed from the trolley apparatus and placed in a package container retained on the packaging table. The trolley apparatus utilizes spaced arms that are rotated to enable the heavy object to be placed on the trolley apparatus and to be separated at the package container station to enable easy removal of the heavy object from the trolley apparatus and lowered into a container at the package/container station.

The packaging table is used in conjunction with the trolley apparatus to retain a container on a platform of the packaging table with the container secured by arms on either side of the container and with a vertical tower controlled by switches to elevate or lower the platform. The packaging table thus offers a simple construction for supporting a container on the platform of the packaging table and for raising or lowering the platform to accommodate different sized containers. The trolley apparatus and the packaging table mate with one other to ensure the proper delivery of the heavy object to the packaging table.

The invention has specific application to enable heavy wound coils to be manually removed from a coil winding machine and placed on a trolley apparatus and rolled or wheeled to a heavy coil packaging table where the heavy wound coil with no lifting and minimal effort may be dropped in a coil package container. The trolley apparatus utilizes spaced arms that are rotated to enable the heavy wound coil to be placed on the trolley apparatus and to be separated, simply by unlocking the arms and pushing down on the heavy coil at the package container station to enable the heavy wound coil from the trolley apparatus to be dropped into a container at the coil package/container station.

The spaced arms are also mounted to be moved vertically to enable adjustment of the spaced arms.

Prior to this invention the heavy coil had to be manually moved from the mandrel of the winding machine and carried to the package container which was a strenuous exercise.

The base of the packaging table is designed to facilitate alignment with the trolley so that the trolley and the package container are aligned when the heavy coil is dropped into the container.

The design of the packaging table enables it to be raised or lowered by appropriate foot-activated control switches, the packaging table also includes rotatable arms on each side of the package container resting on the packaging table platform to prevent it from falling off the platform and to keep it properly aligned under the trolley. The height of the platform may be adjusted to enable the package to be handled more easily by the operator of the packaging table.

The invention claimed is:

1. A trolley apparatus for moving heavy objects from a machine to a container at a packaging table station, comprising:
　　a wheeled base constructed for movement of said trolley apparatus on a floor;
　　a plurality of spaced arms coupled to said base, the arms constructed for vertical translational and rotational movement with respect to said base, wherein said arms rotate to adjust the relative spacing between said arms, and wherein said arms are configured to retain the object between said spaced arms during movement of said trolley apparatus; and locking arms coupled to said base for selectively engaging said spaced arms and for limiting further outward rotation of said spaced arms when the locking arms are engaged with said spaced arms;

wherein said locking arms are constructed to disengage from the spaced arms and permit said spaced arms to rotate into a dispensing position in response to a force applied to the spaced arms that is at least a predetermined force, wherein in said dispensing position said spacing between said spaced arms increases to a size sufficient for the object to pass through said spacing.

2. The trolley apparatus according to claim 1, further comprising a vertical frame coupled between said wheeled base and said spaced arms.

3. The trolley apparatus according to claim 2, wherein said vertical frame includes stop members constructed to engage respective spaced arms to limit inward movement of said spaced arms.

4. The trolley apparatus according to claim 3, wherein said stop members limit inward movement of said spaced arms to maintain a minimum spacing between said spaced arms.

5. The trolley apparatus according to claim 3, wherein said spaced arms are biased towards said stop members by respective biasing members coupled between said spaced arms and said vertical frame.

6. The trolley apparatus according to claim 5, wherein said biasing members include a torsion spring.

7. The trolley apparatus according to claim 5, wherein said predetermined force exceeds biasing forces applied to said spaced arms by said biasing members.

8. The trolley apparatus according to claim 2, wherein said vertical frame extends along a vertical axis and includes a guide member that extends from said vertical frame at an angle with respect to said vertical axis, and wherein said guide member is constructed to guide the object away from the vertical frame as the object passes through said spacing between said spaced arms when said force applied to said spaced arms is at least said predetermined force.

9. A system for moving heavy objects, comprising:
a trolley apparatus including:
a wheeled base constructed for movement of said trolley apparatus on a floor;
a plurality of spaced arms coupled to said base, the arms constructed for vertical translational and rotational movement with respect to said base, wherein said arms rotate to adjust the relative spacing between said arms, and wherein said arms are configured to retain the object between said spaced arms during movement of said trolley apparatus, and
locking arms coupled to said base for selectively engaging said spaced arms and for limiting further outward rotation of said spaced arms when the locking arms are engaged with said spaced arms,
wherein said locking arms are constructed to disengage from the spaced arms and permit said spaced arms to rotate into a dispensing position in response to a force applied to the spaced arms that is at least a predetermined force, wherein in said dispensing position said spacing between said spaced arms increases to a size sufficient for the object to pass through said spacing; and
a packaging table constructed to mate with said trolley apparatus and to receive the object from said trolley apparatus, said table including:
a platform for receiving and supporting the object and movable in a vertical direction, and
a motor for adjusting a position of said platform in said vertical direction.

10. The system according to claim 9, wherein said platform includes means for retaining said object on said platform to prevent slippage from said platform and means for alignment of said object with said platform.

11. The system according to claim 9, wherein said packaging table further includes:
at least one foot-operated switch for activating said motor to adjust said position of said platform.

12. The system according to claim 9, wherein said packaging table further includes:
a base supporting said platform, said base constructed to mate with said wheeled base of said trolley apparatus.

13. The system according to claim 12, wherein when the bases of the platform and the trolley apparatus mate said platform is aligned with said spacing between said spaced arms.

\* \* \* \* \*